9728X
No Printed Specification Available
L. Cole,
Rice Cleaner.
No.
Patented June 16. 1836.
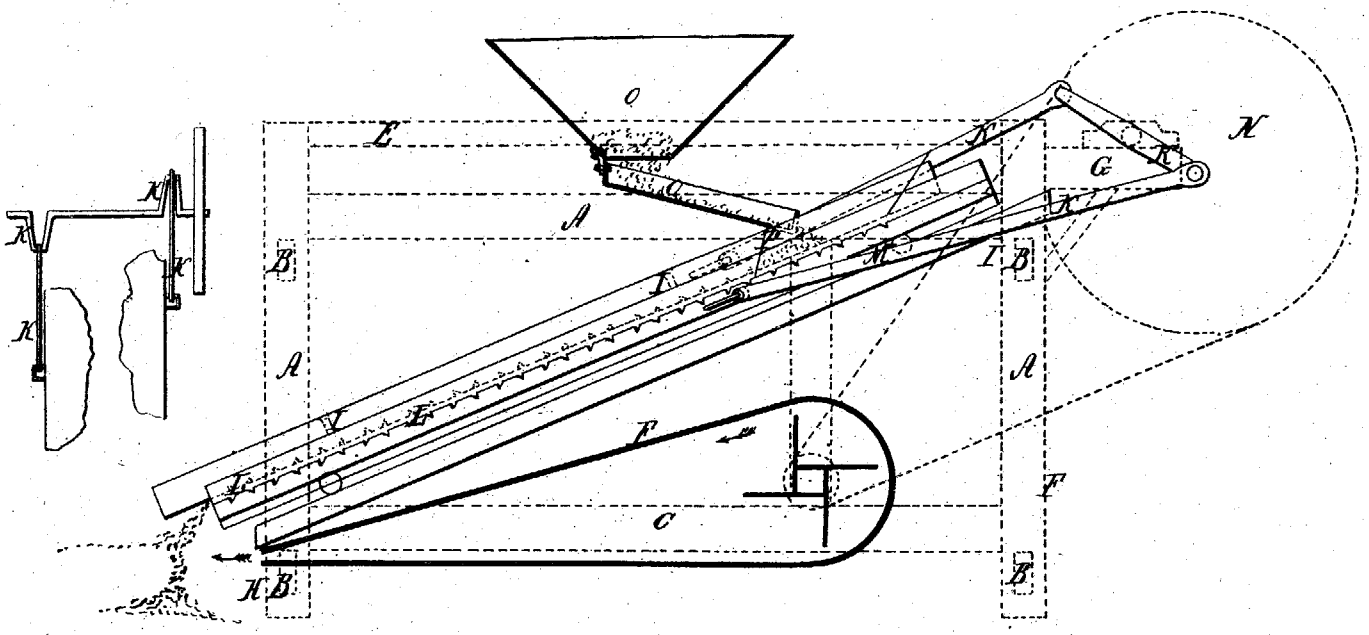

9728 X 6/16/1836

June 16. 1836 [illegible]

Lewis Cole

[illegible]

The Schedule referred to in these Letters Patent
and making part of the same, containing a des-
cription in the words of the said Lewis Cole himself
of his Improvement in the Machine for Hulling
Rice, Barley and Oats.

To all to whom these presents shall come,
Be it known that I Lewis Cole of New Gloucester
in the County of Cumberland and State of Maine
have invented a new and useful Machine for
Hulling Rice, Barley and Oats, which has not
[illegible] said [illegible] [illegible] that the fol-
lowing is a full and exact description thereof.
A frame [illegible] feet long and four feet high
with four posts one at each corner, which frame
is marked A upon the drawing of the same, the
width of said Machine is two feet wide inside and it
is fastened together by four short girts two at each
end as appears by letter B. at the sides two sills
marked C. (one on each side) one foot from the lower
end of each post to the top of the sill. Two girts
[illegible] marked E. [illegible] inches from the
top of each post [illegible] and both sides of said
frame [illegible] as appears by letter F. [illegible]
[illegible] of the frame two posts two feet long are fra-
med into the girts, one [illegible] at or near
the top of the post with a [illegible] each post and
girt as appears by letter G. one of the above described
short girts is placed [illegible] inches from the bottom
of the posts at the end opposite the [illegible] of said
machine as appears by letter H. [illegible] girt marked 6/16/1836 9728x

[illegible]

[illegible] leading from said [illegible] flour to the
[illegible] which the said [illegible] flour or
flour passes through the [illegible] leaves the
rubber. A mortise is made in the top rubber to
receive the grain between the two rubbers, and the
lower part of the mortise is [illegible] on the under
side of the top rubber so that it may receive
the grain. — The [illegible] marked [illegible] are
[illegible], four inches in the top rubber from the low-
er end of the mortise. Said Machine may be
propelled by water, steam, horse [illegible] power,
[illegible] [illegible] [illegible] [illegible] [illegible] for
[illegible] [illegible] [illegible] [illegible] which [illegible]
[illegible] of wood or metal [illegible] [illegible] above
described. [illegible] The above described Machine may
be made larger or smaller (as the case may re-
quire) than is [illegible] in this specification,
the same proportions being observed throughout.
I claim all the above described Machine
in the specification, with the right to make
the same Machine larger or smaller as the
case may require.

Witnesses

Augustine Harris

Wm. H. Winslow

[illegible] Cole.

E70[illegible]